US010218641B2

(12) United States Patent
Lin et al.

(10) Patent No.: US 10,218,641 B2
(45) Date of Patent: Feb. 26, 2019

(54) HANDLING DYNAMIC CASCADE PORT/LAG CHANGES IN A NON-BLOCKING MANNER

(71) Applicant: ARRIS Enterprises LLC, Suwanee, GA (US)

(72) Inventors: Kwun-Nan Kevin Lin, Saratoga, CA (US); Bipin Agarwal, San Jose, CA (US)

(73) Assignee: ARRIS Enterprises LLC, Suwanee, GA (US)

(*) Notice: Subject to any disclaimer, the term of this patent is extended or adjusted under 35 U.S.C. 154(b) by 128 days.

(21) Appl. No.: 15/276,579

(22) Filed: Sep. 26, 2016

(65) Prior Publication Data

US 2017/0104694 A1    Apr. 13, 2017

Related U.S. Application Data

(60) Provisional application No. 62/239,378, filed on Oct. 9, 2015.

(51) Int. Cl.
*H04L 12/741* (2013.01)
*H04L 12/935* (2013.01)
(Continued)

(52) U.S. Cl.
CPC .......... *H04L 49/30* (2013.01); *H04L 12/4641* (2013.01); *H04L 45/586* (2013.01)

(58) Field of Classification Search
None
See application file for complete search history.

(56) References Cited

U.S. PATENT DOCUMENTS

| 6,950,855 B2 | 9/2005 | Sampathkumar |
| 7,558,835 B1 | 7/2009 | Shafer |

(Continued)

FOREIGN PATENT DOCUMENTS

| EP | 2696538 A1 | 2/2014 |
| WO | 2017062671 A1 | 4/2017 |
| WO | 2017070587 A1 | 4/2017 |

OTHER PUBLICATIONS

International Search Report and Written Opinion for International Appln. No. PCT/US2016/055827 dated Jan. 25, 2017, 15 pages.

(Continued)

*Primary Examiner* — Brandon M Renner
(74) *Attorney, Agent, or Firm* — Stewart M. Wiener

(57) ABSTRACT

Techniques for handling dynamic cascade port/LAG changes in an extended bridge are provided. According to one embodiment, a first network device in an extended bridge can maintain a shadow table that stores information regarding one or more ports and one or more LAGs used to interconnect the network devices in the extended bridge. The first network device can further receive, from a user via a device UI, a command relating to a change to a port or a LAG, update the shadow table based on the change, transmit a change message to one or more other network devices affected by the change, and start a timer associated with the one or more other network devices. In various embodiments, the updating and the transmitting can be performed without blocking the user from entering further commands via the device UI.

20 Claims, 4 Drawing Sheets

(51) Int. Cl.
*H04L 12/46* (2006.01)
*H04L 12/713* (2013.01)

(56) References Cited

U.S. PATENT DOCUMENTS

| | | | |
|---|---|---|---|
| 7,675,869 B1 | 3/2010 | Anker et al. | |
| 2005/0283353 A1* | 12/2005 | Billingsley | G06Q 10/10 703/23 |
| 2009/0055693 A1* | 2/2009 | Budko | G06F 21/53 714/57 |
| 2012/0150829 A1* | 6/2012 | Bourbonnais | G06F 17/30578 707/703 |
| 2013/0230047 A1* | 9/2013 | Subrahmaniam | H04L 47/2441 370/392 |
| 2014/0156906 A1 | 6/2014 | Babu et al. | |
| 2014/0181275 A1 | 6/2014 | Lin et al. | |
| 2014/0269710 A1 | 9/2014 | Sundaram et al. | |
| 2015/0178232 A1* | 6/2015 | Anyuru | G06F 13/362 710/110 |
| 2015/0281072 A1* | 10/2015 | Arumugam | H04L 41/0816 370/392 |
| 2016/0124773 A1* | 5/2016 | Gaurav | G06F 9/50 718/104 |
| 2017/0085488 A1 | 3/2017 | Bhattacharya et al. | |
| 2017/0093628 A1 | 3/2017 | Lin et al. | |
| 2017/0104626 A1 | 4/2017 | Lin et al. | |
| 2017/0104665 A1 | 4/2017 | Gowthaman | |
| 2017/0111296 A1 | 4/2017 | Agarwal et al. | |
| 2017/0118041 A1 | 4/2017 | Bhattacharya et al. | |
| 2017/0118042 A1 | 4/2017 | Bhattacharya et al. | |

OTHER PUBLICATIONS

Virtual Bridged Local Area Networks—Bridge Port Extension, IEEE Computer Society, IEEE Std 802.1 BR-2012, Jul. 16, 2012, 121 pages.
Brocade FastIron Switch Port Extender, Configuration Guide, Supporting FastIron Software Release 8.0.40, Feb. 29, 2016, 88 pages.
International Search Report and Written Opinion for International Appln. No. PCT/US2016/058283 dated Feb. 17, 2017, 12 pages.
Lockwood et al., "Automated Tools to Implement and Test Internet Systems in Reconfigurable Hardware", ACM SIGCOMM Computer Communications Review, vol. 33, No. 3, Jul. 2003, pp. 103-110.
U.S. Appl. No. 15/489,395, filed Apr. 17, 2017 by Kwun-Nan Kevin Lin.
Cisco Nexus 5600 Series NX-OS Layer 2 Switching Configuration Guide, Release 7.x; Mar. 15, 2014; Cisco Systems, Inc.; 280 pages.
Configuring the Fabric Extender, Chapter 2; Cisco Nexus 2000 Series Fabric Extender Software Configuration Guide; 16 pages.
Configuring Port Extender Stack; Dell Networking C9010/C1048P; Jan. 30, 2017; https://qrl.dell.com/Files/enus/Html/C9010_C1048P/Configuring%20PE%20Stack.html; 3 pages.
Understanding Junos Fusion Provider Edge Components; Technical Documentation—Support—Juniper Networks; Mar. 31, 2017; 5 pages; https://www.juniper.net/documentation/en_US/junos/topics/concept/fusion-components.html.
U.S. Appl. No. 15/595,747, filed May 15, 2017 by Bipin Agarwal.
U.S. Appl. No. 15/272,218, filed Sep. 21, 2016 by Somen Bhattacharya.
U.S. Appl. No. 15/276,619, filed Sep. 26, 2016 by Kwun-Nan Kevin Lin et al.
U.S. Appl. No. 15/286,472, filed Oct. 5, 2016 by Bipin Agarwal et al.
U.S. Appl. No. 15/331,067, filed Oct. 21, 2016 by Somen Bhattacharya et al.
U.S. Appl. No. 15/331,160, filed Oct. 21, 2016 by Somen Bhattacharya et al.
Dell Networking Configuration Guide for the C9000 Series, Version 9.9 (0.0), Oct. 2015, 1148 pages.
U.S. Appl. No. 15/229,012, filed Aug. 4, 2016 by Lin et al.
U.S. Appl. No. 15/243,782, filed Aug. 22, 2016 by Ramesh Gowthaman.
Dell C9010 Module Switch Interoperability with Cisco Catalyst 3750, A Development Guide for Dell Networking Switches (v1.0), Dell Network Solutions Engineering, Sep. 2015, 24 pages.
Cisco IOS Command Modes; http://www.cisco.com/c/en/us/td/docs/ios/12_2/configfun/configuration/guide/ffun_c/fcf019.html#wp1000922; Mar. 25, 2016; 20 pages.
Dell Networking C1048P Getting Started Guide, Sep. 2015, 26 pages.
Juniper Networks, Junos Fusion Provider Edge, Release 14.2R4, Feb. 17, 2016, 646 pages.
Cisco StackWise and StackWise Plus Technology, 2016 Cisco, Mar. 25, 2016, 11 pages.
Dell Stack Master Election, Dell Networking Configuration Guide for the C9000 Series Version 9.9 (0.0), Mar. 25, 2016, 1 page.

* cited by examiner

HANDLING DYNAMIC CASCADE PORT/LAG CHANGES IN A NON-BLOCKING MANNER

CROSS-REFERENCES TO RELATED APPLICATIONS

The present application claims the benefit and priority of U.S. Provisional Application No. 62/239,378, filed Oct. 9, 2015, entitled "Techniques for Port Extender (PE) Port and Link Aggregation Group Management." In addition, the present application is related to commonly-owned U.S. patent application Ser. No. 15/276,619, filed concurrently with the present application, entitled "LAG CONFIGURATION/LEARNING IN AN EXTENDED BRIDGE." The entire contents of these applications are incorporated herein by reference in their entireties for all purposes.

BACKGROUND

An 802.1BR-based network topology (also known as an extended bridge) is a logical network entity that comprises two different types of units: a controlling bridge (CB) unit and one or more port extender (PE) units. The CB serves as the controller of the extended bridge and is responsible for performing control plane functions (e.g., Layer 2 switching, Layer 3 routing, etc.) with respect to network traffic passing through the bridge. In contrast the PEs, which connect to the CB and to other devices/hosts external to the extended bridge, act as non-intelligent devices and thus do not perform any local switching or routing; instead, their primary function is to provide additional data port terminations for the CB (thereby extending the port capacity of the CB). For example, each PE may be a switch/router with X number of physical data ports, which appear as virtual data ports on the CB. Upon receiving a data packet from an external device/host on an ingress data port, the PE forwards the data packet to the CB, which processes the data packet in hardware or software to determine an appropriate egress port through which the packet should be sent out. The CB then forwards the data packet to the PE housing the egress port for transmission through that port towards the next hop destination.

The links that interconnect the PEs to each other and to the CB in an extended bridge are known as cascade links. Generally speaking, cascade links are considered internal to the extended bridge since they only carry data traffic that has been tagged with a special "ETAG" header that is understood by the PEs and CB. This ETAG header facilitates the internal routing of data traffic from an ingress PE to the CB for processing, as well as from the CB to the egress PE(s) that will forward the traffic out of the extended bridge.

In order to properly handle ETAG traffic, the physical ports at the endpoints of a cascade link (i.e., cascade ports) need to be configured to operate in an ETAG-enabled mode instead of a conventional data port mode. This configuration is typically performed via an LLDP (Link Layer Discovery Protocol) based exchange between the CB and a given PE at the time the PE joins the extended bridge, and may be updated in response to dynamic port changes that are made during system runtime. In the past, each endpoint of a cascade link has generally been limited to being a single cascade port. However, in new emerging 802.1BR implementations, each endpoint of a cascade link may be a link aggregation group (LAG) that comprises multiple cascade ports but is treated as a single logical port. In these cases, the cascade link may also be referred to as a cascade trunk. With these new implementations, novel techniques are needed to manage the configuration/reconfiguration of such LAGs in an efficient and robust manner.

SUMMARY

Techniques for handling dynamic cascade port/LAG changes in an extended bridge are provided. According to one embodiment, a first network device in an extended bridge can maintain a shadow table that stores information regarding one or more ports and one or more LAGs used to interconnect the network devices in the extended bridge. The first network device can further receive, from a user via a device UI, a command relating to a change to a port or a LAG, update the shadow table based on the change, transmit a message to one or more other network devices in the extended bridge that are affected by the change, and start a timer associated with the one or more other network devices. In various embodiments, the updating and the transmitting can be performed without blocking the user from entering further commands via the device UI.

The following detailed description and accompanying drawings provide a better understanding of the nature and advantages of particular embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

Embodiments of the present disclosure provide techniques for managing cascade LAGs (i.e., LAGs at the endpoints of a cascade link/trunk) in an 802.1BR-based extended bridge.

According to one set of embodiments, these techniques include a workflow that can be performed by a CB for configuring the cascade LAG(s) of a given PE at the time the PE joins the extended bridge. As part of this workflow, the CB can automatically resolve conflicts between the LAG configuration programmed on the PE and a provisional LAG configuration programmed on the CB (if such provisional configuration exists). This conflict resolution mechanism can minimize the likelihood of a misconfiguration that prevents the PE from communicating with the CB and other PEs upon joining the bridge.

According to another set of embodiments, the techniques of the present disclosure include (1) methods for validating dynamic cascade port/LAG changes made to a live cascade link/trunk, and (2) an algorithm for executing such dynamic cascade port/LAG changes in a "non-blocking" manner (i.e., a manner that allows a user to enter additional cascade port/LAG change commands before a prior command has completely finished processing). With (1) and (2), the CB can ensure that the requested change commands will not break PE-to-PE and PE-to-CB communication, while at the same time improving the user experience of administrators responsible for entering cascade port/LAG changes via the CB user interface.

The foregoing and other aspects of the present disclosure are described in further detail in the sections that follow.

2. Example Extended Bridge and Switch/Router Architecture

Figure 1A:
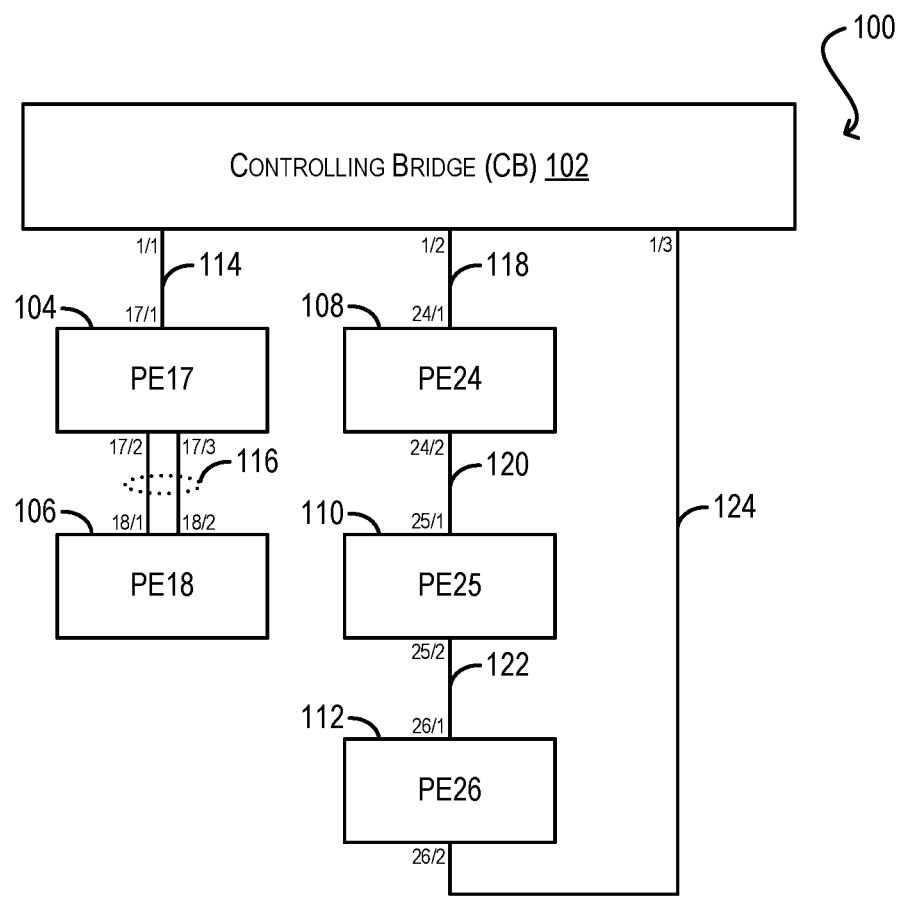
FIGS. 1A and 1B depict an example extended bridge and an example switch/router architecture according to an embodiment.

FIG. 1A depicts an extended bridge 100 in which embodiments of the present disclosure may be implemented. As shown, extended bridge 100 comprises a CB 102 that is connected to a number of PEs 104-112 via cascade links 114-124. CB 102 may be implemented using a relatively high-end switch/router that is capable of handling control plane functions (e.g., L2 forwarding, L3 routing, bridge management, etc.) for the entirety of extended bridge 100. In contrast, PEs 104-112 may be implemented using relatively lower-end switches/routers that are sufficient for carrying out PE functions as defined in the IEEE 802.1BR standard. For instance, in one embodiment, CB 102 may be a high-cost, modular chassis-based switch/router, while PEs 104-112 may be lower-cost, "pizza box" style fixed-form factor switches/routers.

In the example of FIG. 1A, cascade link 116 between PE 104 (PE17) and PE 106 (PE18) is a cascade trunk comprising two physical links. These two physical links are connected respectively to a 2-port LAG on the side of PE17 (comprising cascade ports 17/2 and 17/3) and to a 2-port LAG on the side of PE18 (comprising cascade ports 18/1 and 18/2). Either of the two physical links of cascade trunk 116 may be used to exchange ETAG traffic between PE17 and PE 18. The other cascade links in extended bridge 100 are non-LAG links (i.e., links with a single cascade port at each endpoint).

Figure 1B:
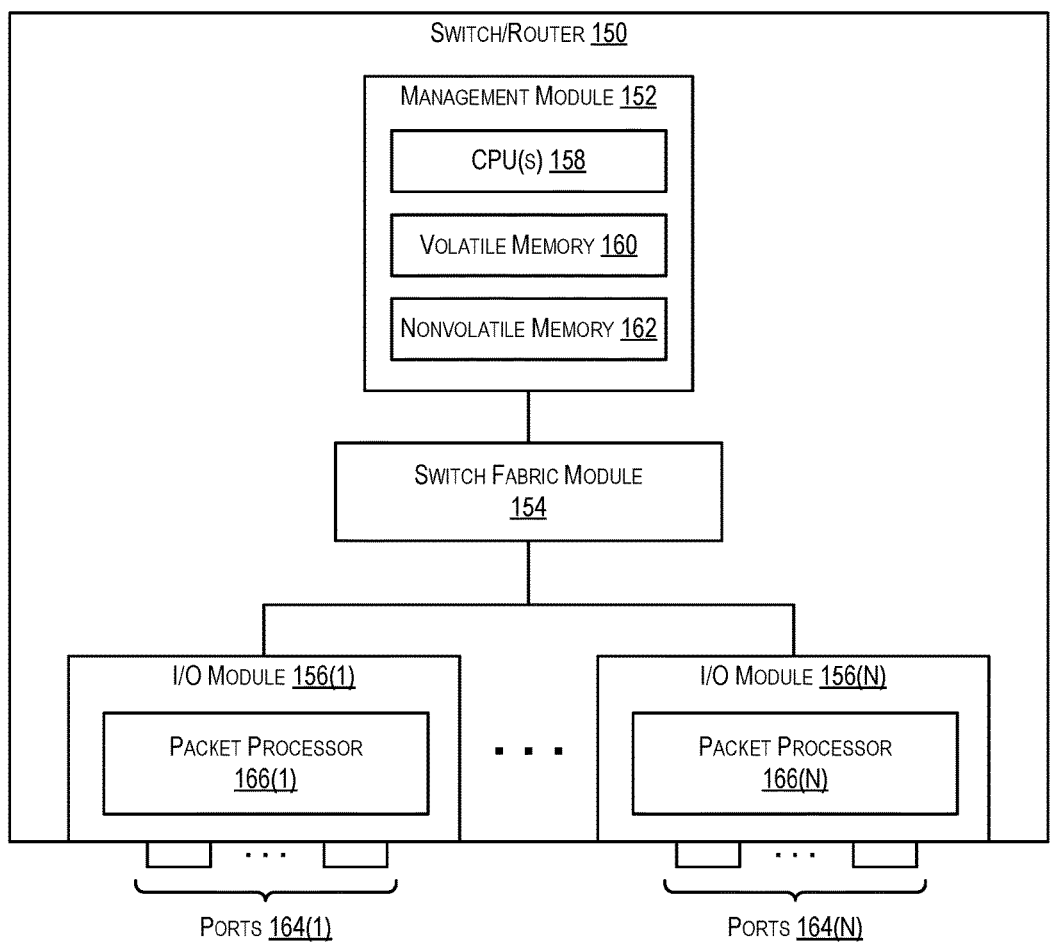

FIG. 1B depicts the architecture of an example switch/router 150 that may be used to implement CB 102 and/or PEs 104-112 of FIG. 1A according to an embodiment. As shown in FIG. 1B, switch/router 150 comprises a management module 152, a switch fabric module 154, and one or more I/O modules 156(1)-(N). Management module 152 includes one or more management CPUs 158 for managing/controlling the operation of switch/router 150. Each management CPU 158 can be a general purpose processor, such as a PowerPC, Intel, AMD, or ARM-based processor, that operates under the control of software stored in an associated volatile memory (e.g., RAM) 160 and/or nonvolatile memory (e.g., ROM, flash memory, etc.) 162.

Switch fabric module 154 and I/O module(s) 156(1)-(N) collectively represent the data, or forwarding, plane of switch/router 150. Switch fabric module 154 is configured to interconnect the various other modules of switch/router 150. Each I/O module 156(1)-(N) includes one or more ports 164(1)-(N) that are used by switch/router 150 to send and receive data packets to/from other networks/hosts, as well as to/from other units within extended bridge 100 of FIG. 1A. Each I/O module 156(1)-(N) also includes a packet processor 166(1)-(N) that can make wire speed decisions on how to handle incoming or outgoing data packets.

As noted in the Background section and as depicted in FIG. 1A, some emerging 802.1BR implementations support the use of LAGs, rather than singular ports, to form internal PE-to-PE or PE-to-CB connections. However, properly managing the configuration of such LAGs can be challenging for various reasons. For example, in certain scenarios the CB and a joining PE may maintain different and conflicting LAG configurations. As another example, a user may attempt to make rapid (via, e.g., cut-and-paste) changes to the ports/LAG(s) of a cascade link/trunk during system runtime, which need to be validated and processed in a timely manner.

To address these and other similar challenges, switch/router 150 of FIG. 1B can be enhanced to support novel LAG management techniques when operating as a CB in an extended bridge, such as CB 102 of FIG. 1A. These techniques can be implemented via, e.g., program code that is executed by management CPU(s) 158, and/or via one or more new hardware modules that are added to switch/router 150 (not shown). As described in further detail below, the LAG management techniques of the present disclosure can include techniques that enable the CB to, e.g., intelligently configure/learn the LAG(s) of a PE at the time the PE joins the extended bridge, validate dynamic cascade port/LAG changes made to a live cascade link/trunk, and execute such dynamic cascade port/LAG changes without blocking user input of further commands. With these capabilities, the CB can handle cascade LAG configuration and reconfiguration in the extended bridge in an efficient, robust, and user-friendly fashion.

It should be appreciated that FIGS. 1A and 1B are illustrative and not intended to limit embodiments of the present disclosure. For example, although FIG. 1A depicts a particular topology for extended bridge 100, any other type of topology may be used. Further, the various entities shown in FIGS. 1A and 1B may have additional subcomponents or functions that are not described. One of ordinary skill in the art will recognize many variations, modifications, and alternatives.

3. Cascade LAG Configuration/Learning Upon PE Join

Under the 802.1BR standard, when a PE joins an extended bridge (i.e., is physically attached to the bridge and powered-on for the first time), the PE sends out an LLDP join packet on all of its cascade ports. This LLDP join packet, which is ultimately received by the CB, includes PE configuration information that enables the CB to integrate the PE into the extended bridge, such as PE identifier (ID), egress port, modules types, cascade ports, software image version, etc.

In some cases, the PE may have one or more cascade LAGs configured/programmed on the device at the time of the join. For example, the PE may have been moved from another extended bridge in which the PE was previously connected via a cascade trunk. In these cases, the LAG configuration on the PE (which identifies the PE's LAGs and the member cascade ports of each LAG) will be included in the LLDP join packet that is sent to the CB.

However, in certain scenarios, the CB itself may also maintain, based on the joining PE's ID, a provisional configuration for the PE that includes one or more cascade LAGs. For example, the extended bridge may have previously included a PE unit with the same assigned ID and with one or more LAGs which was removed and replaced with the joining PE unit. Alternatively, a user may have entered a provisional LAG configuration for that PE ID via the CB's command line interface (CLI). In these scenarios, there may be inconsistencies or conflicts between the LAG configuration on the CB and the LAG configuration received from the PE that make it difficult for the CB to determine which LAG configuration should be actually used. If the CB uses the wrong configuration, the joining PE may be unable to properly communicate with the CB and upstream PEs.

Figure 2:
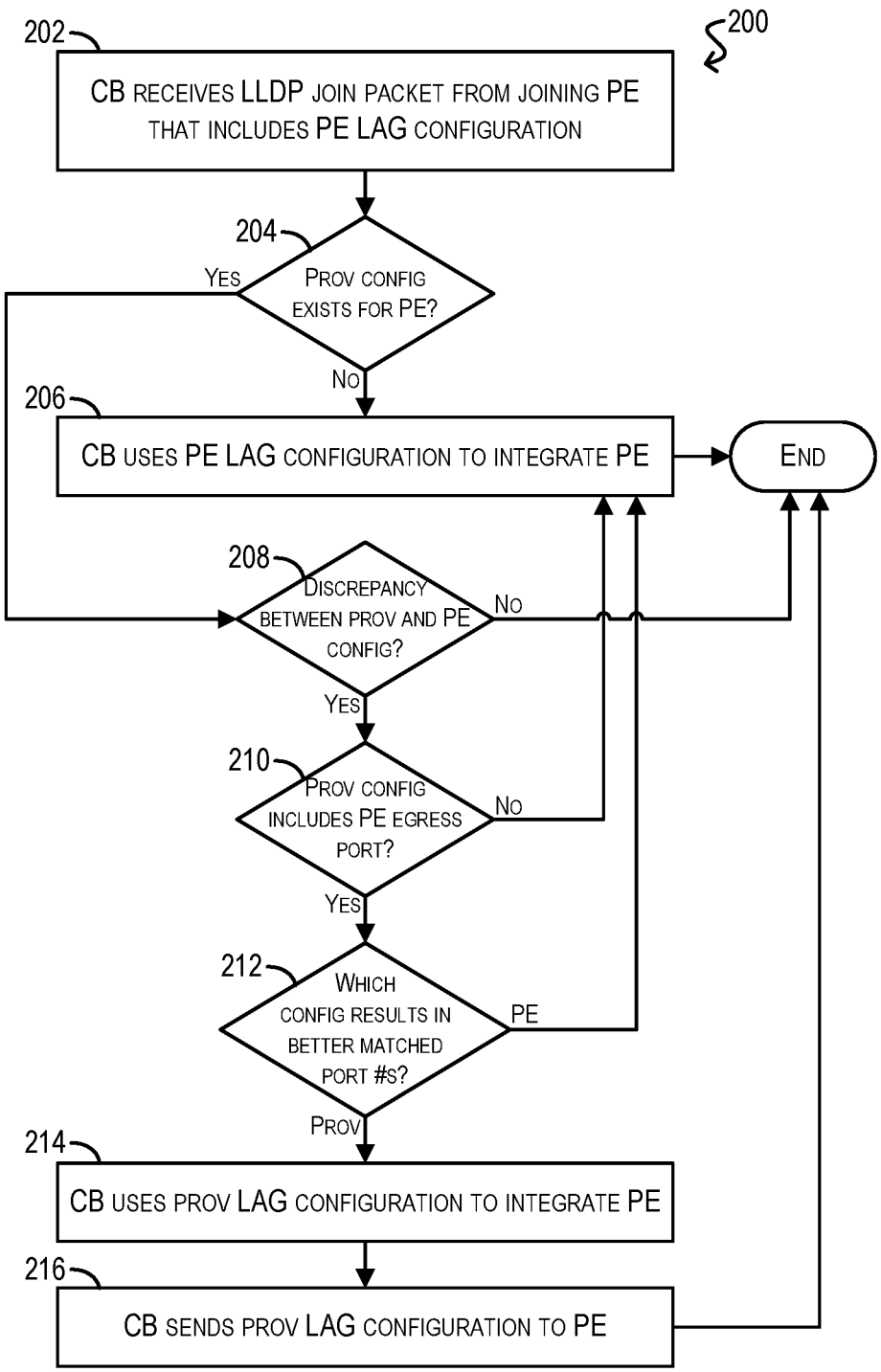
FIG. 2 depicts a workflow that may be executed by a CB in an extended bridge for configuring/learning the LAG configuration of a PE at the time the PE joins the bridge according to an embodiment.

To overcome this problem, FIG. 2 depicts a workflow 200 that may be executed by switch/router 150 (acting as a CB in an extended bridge) for configuring/learning the LAG(s) for a PE at the time the PE joins the extended bridge according to an embodiment. With workflow 200, the CB can intelligently resolve conflicts between the LAG configuration programmed on the PE and a provisional LAG configuration programmed on the CB (if such provisional configuration exists), thereby minimizing the likelihood of a misconfiguration that prevents the PE from communicating with the CB and other PEs upon joining the bridge.

Starting with block 202, the CB can receive an LLDP join packet from the joining PE. As mentioned previously, the payload of the LLDP join packet can include information regarding the existing configuration of the PE, such as PE ID, egress port on which the join packet was sent out, module types, image version, cascade ports, etc. For purposes of this workflow, it is assumed that the PE has one or more pre-configured cascade LAGs, and thus the LLDP join packet also includes information regarding the PE's LAG configuration (e.g., the LAGs configured on the PE and port IDs belonging to each LAG).

At block 204, the CB can check whether it has a provisional LAG configuration for the joining PE (per its PE ID). If not, the CB can integrate the PE using the PE LAG configuration (block 206) and workflow 200 can end.

On the hand, if the CB does have a provisional LAG configuration for the joining PE at block 204, the CB can check whether there is any discrepancy between the provisional LAG configuration and the PE LAG configuration included in the LLDP join packet (block 208). For example, as part of block 208, the CB can check whether the provisional and PE LAG configurations specify the same number of LAGs and the same port IDs per LAG.

If there is no discrepancy between the two LAG configurations, the CB can conclude that no change needed with respect to the PE's LAGs and workflow 200 can end.

If there is a discrepancy, the CB can proceed to check whether the provisional LAG configuration includes the port of the PE from which the LLDP join packet was sent (i.e., the PE's egress port) (block 210). If no, the CB can conclude that using the provisional LAG configuration may break communication with the PE, and thus the CB can use the PE LAG configuration (block 206) and workflow 200 can end.

However, if the provisional LAG configuration does include the PE egress port, the CB can finally check which LAG configuration (i.e., provisional or PE) results in better matched port number(s) for the cascade link(s)/trunk(s) connecting to the PE (block 212). Stated another way, the CB can determine which LAG configuration more closely aligns with the number of ports in the cascade port/LAG configurations of other PEs/CBs that are adjacent to the PE in the system topology.

In the case that the CB determines the provisional LAG configuration is a better match, the CB can use the provisional LAG configuration (block 214) and send this provisional configuration to the PE for local programming (block 216). Conversely, in the case that the CB determines the PE LAG configuration is a better match, the CB can use the PE LAG configuration (block 206). In either case, the CB's processing can terminate and workflow 200 can end.

Although not explicitly shown in FIG. 2, in some situations the provisional and PE LAG configurations may be determined to be equally good matches at block 212. In these situations, the CB may choose the provisional LAG configuration by default and send the provisional configuration to the PE per block 216.

To clarify the operation of workflow 200, consider the following exemplary scenario with respect to extended bridge 100 of FIG. 1A. In this scenario PE17 and PE18 have not yet joined the bridge.

1. Assume PE17 joins extended bridge first and sends an LLDP join packet to CB 102 including a cascade port/LAG configuration that identifies port 17/1 as a singular cascade port and ports 17/2 and 17/3 as part of a 2-port cascade LAG.
2. Further assume that CB 102 does not have a provisional PE configuration for PE17.
3. In this case, CB 102 can learn the cascade port/LAG configuration from PE17 and can integrate PE17 using this PE-side configuration. As part of this process, CB 102 can make all of the ports of PE17, except for ports 17/1, 17/2, and 17/3, data ports of extended bridge 100.
4. Assume PE18 joins extended bridge after PE17 and sends an LLDP join packet (from port 18/2) to CB 102 through PE17. This LLDP join packet includes a cascade port/LAG configuration that identifies ports 18/1 and 18/2 as a 2-port cascade LAG.
5. Further assume that CB 102 has a provisional configuration for PE18 (based on its PE ID) that specifies a 3-port LAG including 18/2 (i.e., the egress port from which the LLDP join was sent).
6. In this case, CB 102 can determine that there is discrepancy between the provisional and PE LAG configurations for PE18, check whether the provisional LAG configuration includes PE18's egress port (it does), and then check which LAG configuration can better match the LAG on PE17 (i.e., ports 17/1 and 17/2) which connects to PE18.
7. Since the PE18's LAG configuration better matches the PE17 LAG (i.e., PE18's LAG configuration specifies two ports, whereas the provisional LAG configuration specifies three ports), CB 102 can use PE18's LAG configuration over the provisional LAG configuration and integrate PE 18 accordingly.

In some embodiments, once a PE joins an extended bridge and the system stabilizes, the CB can count the number of active ports (i.e., ports in an "up" status) on both ends of the PE's cascade link(s)/trunk(s). If the active port numbers are not equal, the CB can generate an error message or log to notify users of this mismatch.

4. Validating Dynamic Cascade Port/LAG Changes

In certain 802.1BR implementations, the CB in an extended bridge may expose a user interface (e.g., one or more CLI commands) that allows users to make dynamic changes to the cascade ports/LAGs at the endpoints of a live cascade link/trunk during system runtime. One example of such a CLI command is the "multi-spx-lag" command exposed by 802.1BR-compatible switches and routers developed by Brocade Communications Systems, Inc. The types of changes that can be made using this command include, e.g., changing a cascade port into a cascade LAG, changing a cascade LAG into a cascade port, increasing or reducing the number of ports in a cascade LAG, changing port speeds, etc. Unfortunately, existing 802.1BR implementations have limited capabilities for validating dynamic port/LAG changes, and thus an erroneous or invalid change command can potentially break communication in the topology.

To address this deficiency, embodiments of the present disclosure provide a novel set of static and dynamic validations that may be implemented by the CB for validating cascade port/LAG changes to a live cascade link/trunk. With these validations, the CB can minimize or eliminate the likelihood that such changes will break PE-to-PE or PE-to-CB communication.

4.1 Static Validations

The following is a list of static validations that may be executed by the CB upon receiving a command to change the cascade port(s)/LAG(s) of a live cascade link/trunk according to an embodiment. The "static" qualifier means that these validations do not depend on the runtime state of the system.

1. The CB can verify that all ports in a newly configured cascade LAG have the same configured speed
2. The CB can verify that all newly configured cascade ports (or all ports in a newly configured cascade LAG) are not part of a tagged VLAN
3. The CB can verify all newly configured cascade ports (or all ports in a newly configured cascade LAG) are not used in specific protocols such as OSPF (Open Shortest Path First) and PIM (Protocol Independent Multicast)

4.2 Dynamic Validations

The following is a list of dynamic validations that may be executed by the CB upon receiving a command to change the cascade port(s)/LAG(s) of a live cascade link/trunk according to an embodiment. The "dynamic" qualifier means that these validations depend at least partially on the runtime state of the system (e.g., port up/down statuses, current topology, etc.).

1. The CB can determine the number of live cascade ports/LAGs that have a common member with a newly configured cascade port/LAG.
   a. If the number is zero, the CB can conclude that the newly configured cascade port/LAG is not associated with any live cascade link; therefore, the newly configured link/LAG does not need to be validated using any other dynamic validations (static validations will generally still apply)
   b. If the number is one, the CB can conclude that the newly configured cascade port/LAG replaces an existing cascade port/LAG.
   c. If the number is greater than one, the CB can conclude that the change would merge two live links into one and thus can block the change
2. The CB can verify that the newly configured cascade port/LAG results in the same number of ports at both ends of the connected link
3. The CB can verify that the newly configured cascade port/LAG results in the same number of ports in the "up" status at both ends of the connected link In most cases, the CB will not know about the physical connections of the newly configured cascade port/LAG; thus, it is not possible for the CB to identify/avoid all potential errors and misconfigurations. The validations described above are the ones that can be performed by the CB in these cases since, at the very least, the CB knows about its own port status and the port statuses of all joined PEs.

In situations where the CB has more detailed knowledge regarding the physical port connections of the LAGs the system, the CB may be able to perform more strict validations than those listed above. For example, suppose a cascade LAG on a first PE comprising ports (1/1, 1/2) links to another cascade LAG on a second PE comprising ports (2/1, 2/2). If the CB only knows that 1/2 is physically connected to 2/2 and has no idea about whether 1/1 is physically connected to 2/1 or not, the CB may allow a user to change the first LAG from (1/1, 1/2) to, e.g., (1/2, 1/3). However, if the CB also knows that 1/1 is physically connected to 2/1, the CB can correctly block this change, or require the user to make a corresponding change to the second LAG (2/1, 2/2).

5. Handling Dynamic Cascade Port/LAG Changes in a Non-Blocking Manner

Even in cases where a user enters a correct and valid command for dynamically changing a cascade port/LAG, it may be possible for the change to break communication within the extended bridge on a permanent basis if the change is not handled correctly. For example, assume a first LAG (1/1, 1/2) on a first PE1 links to a second LAG (2/1, 2/2) on a second PE2. PE1 is upstream from (i.e., closer to the CB than) PE2. Further assume that a user enters a command at the CB to change (1/1, 1/2) to (1/1, 1/3) and change (2/1, 2/2) to (2/1, 2/3).

In this scenario, the CB will send messages to both PE1 and PE2 to reprogram their local LAG configurations in accordance with the user command. However, if PE1 receives its message before PE2, PE1 may make the LAG changes in hardware before PE2 is able to receive its message. If PE1 attempts to forward PE2's change message over the changed cascade port (i.e., 1/3), the message will never be received by PE2, resulting in a permanent break in communication between the two units.

One way to avoid this problem is for the CB to send the messages to the PEs in a serial (synchronous) fashion, such that PE2 always receives its message before PE1. For instance, the CB can send the change message to PE2 first, wait for an acknowledgement from PE2 that the message has been received, and then subsequently send the change message to PE1. This ensures that, even though there may be a temporary break in communication due to the reprogramming of the cascade trunk on the PE2 side, PE1 will always receive its change message, and thus the temporary break will be resolved once PE1 reprograms its LAG in accordance with the changes to PE2.

Unfortunately, this synchronous approach can have adverse consequences for the user/administrator responsible for entering the change commands via the CB UI. In particular, since the CB needs to wait for each affected PE to receive its change message and return an acknowledgement before propagating the change to other upstream PEs, the user may need to wait for a significant period of time while the CB processes a given change command (e.g., on the order of several seconds). During this period, the user will generally be unable to enter further commands. This results in a subpar user experience, and can be particularly problematic if the user is attempting to enter multiple change commands in quick succession (by, e.g., cutting and pasting multiple commands into the CB CLI from a configuration file). In this case, the CB may not be able to validate the commands successfully, or otherwise return inconsistent results due to timing issues.

Figure 3:
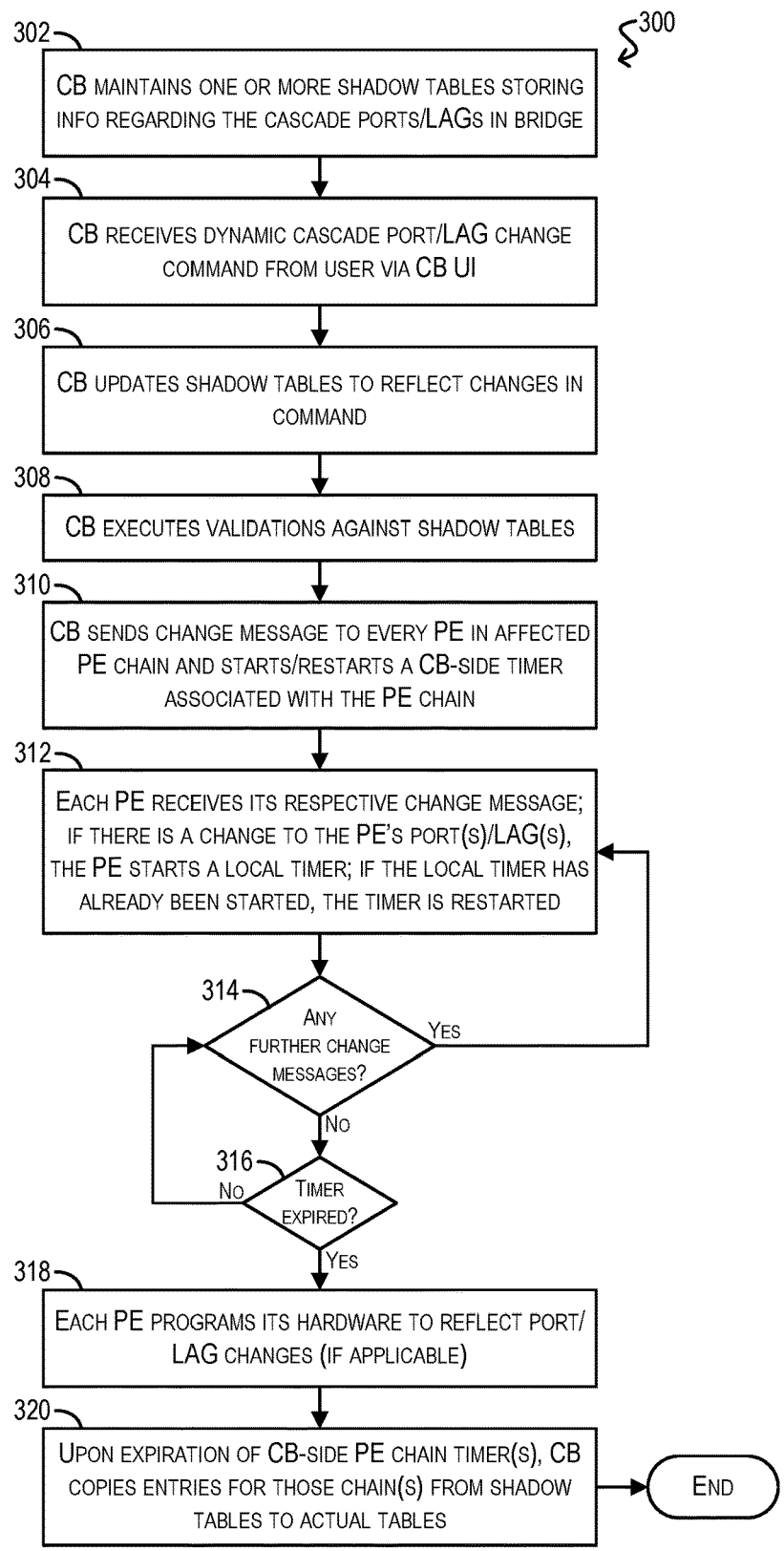
FIG. 3 depicts a workflow that may be executed by a CB in an extended bridge for handling dynamic cascade port/LAG changes in a non-blocking manner according to an embodiment.

To address the foregoing, FIG. 3 depicts a workflow 300 that may be executed by switch/router 150 of FIG. 1A (acting as a CB in an extended bridge) for processing dynamic cascade port/LAG changes in a non-blocking manner according to an embodiment. With workflow 300, the CB can both (1) ensure that the cascade port/LAG changes are handled properly (i.e., do not result in a permanent loss of communication between PEs or CBs) and (2) allow users to enter additional change commands via the CB UI before a prior command has completely finished processing.

Starting with block 302, the CB can maintain one or more "shadow" tables that store information regarding all of the cascade ports/LAGs in the entire extended bridge. For instance, these shadow tables can identify each cascade port/LAG, its host PE/CB, its port members, and topology connections. The shadow tables are separate from the actual tables/data structures used by the CB for maintaining cascade port/LAG configurations for the extended bridge.

At block 304, the CB can receive a dynamic cascade port/LAG change command from a user via the CB's UI. Upon receiving the command, the CB can immediately return control to the user, such that he/she is not blocked from entering further change commands. For example, in one embodiment, the CB can place the received command into a buffer queue that is processed using a thread that is separate from the thread handling the CB's UI.

At block 306, the CB can retrieve the command from the buffer queue if applicable and can update the shadow tables to reflect the cascade port/LAG change(s) included in the command. For instance, if the command includes a deletion of a port from a LAG, the CB can remove that port from the LAG in the shadow tables. Similarly, if the command includes the addition of a port to a LAG, the CB can add that port to the LAG in the shadow tables. Note that the CB does not update its actual cascade port/LAG tables as part of this step.

At block 308, the CB can execute validations with respect to the port/LAG change(s) as captured in the shadow tables. These validations can include, e.g., the static and dynamic validations described in Section (4) above. If any of the validations fail, the CB can output an error message or log and exit the workflow (not shown).

Assuming the validations are successful, the CB can send a change message to every PE in the PE chain of the extended bridge that is affected by the changes. This change message can include instructions for reprogramming the PE's local cascade port/LAG configuration in accordance with the change(s) (if applicable) (block 310). Further, the CB can maintain and start a timer for this PE chain. This per-PE chain timer can be restarted by the PE each time the user changes a cascade port/LAG in the chain. If there are changes to multiple PE chains, the CB will maintain and start a separate timer for each PE chain. Note that the particular order in which the change messages are sent by the CB, or received by the PEs, is not important.

At block 312, each PE in the affected PE chain can receive its respective change message and, if there is a change to one of its cascade ports/LAGs, can start a local timer for a predefined time interval (e.g., 1 second, 5 seconds, etc.). This predefined time interval can be the same time interval used by the per-PE chain timer(s) maintained on the CB. If the local timer already has been started due to receiving a previous change message, the PE can restart the timer, even if the current change message does not affect the cascade ports/LAGs of the PE. The starting/restarting of this timer ensures that every PE in the extended bridge receives its change message before any port/LAG reprogramming is initiated, and thus avoids the problematic scenario mentioned previously where an upstream PE reprograms its side of a cascade link/trunk before the downstream PE can receive its change message, resulting in a permanent communication break on that link/trunk.

While the local timer is running, each PE can continually check for (1) any additional port/LAG change messages received from the CB (block 314), and (2) timer expiration (block 316). If an additional change message is received before the timer expires, the timer can be restarted (or a new timer can be started if no timer was previously initialized).

Otherwise, upon timer expiration, each PE can program itself (i.e., the port hardware and any software configuration data structures) to reflect the port/LAG change(s) included in the received change message(s) (if applicable) (block 318). Note that since each PE is guaranteed (or at least highly likely) to have received its respective change message from the CB by the end of the timer, even though there may be temporary breaks in communication as each PE programs its hardware/software, the overall extended bridge will reach a stable and error-free state once all PEs have completed their programming.

In addition, upon expiration of the CB-side per-PE chain timer(s) on the CB, the CB can copy the entries in the shadow tables for those PE chain(s) to the actual cascade port/LAG tables (block 320). Since each CB-side PE chain timer will be time aligned with the local timers of the PEs in that chain, the CB knows that when the CB-side timer has expired, all of the local PE hardware programming for the chain has been (or will be soon) completed, and thus the shadow table entries can be propagated to the actual port/LAG tables. Finally, at the conclusion of block 320, workflow 300 can end.

To clarify the operation of workflow 300, consider the following exemplary scenario with respect to extended bridge 100 of FIG. 1A.

1. Assume a user enters, at time 0, a first command to change the LAG on PE17 from ports (17/2, 17/3) to ports (17/2, 17/4) and change the LAG on PE18 from ports (18/1, 18/2) to ports (18/1, 18/3).
2. In response, the CB can validate the command and send change messages to all PEs to notify them of the changes.
3. Upon receiving the change messages, PE17 and PE18 (which are affected by the change command) can each initiate a local timer for hardware programming that expires after a predefined time interval (in this case, assume 1 second).
4. Assume the user subsequently enters, at time 0.5 seconds, a second command to change the port speeds of the LAGs on PE17 and PE18.
5. In response, the CB can validate the command and send a second round of change messages to all PEs with these new changes.
6. Upon receiving the second round of change messages, PE17 and PE18 can each reset its local timer, thereby delaying hardware programming by another second (e.g., at 1.5 seconds).
7. All timers expire at 1.5 seconds. At this time PE17 and PE18 can each program its pending port/LAG changes in hardware.

It should be appreciated that workflow 300 is illustrative and various modifications are possible. For example, while workflow 300 (and the example scenario above) suggests that the CB sends multiple port/LAG change messages to the PEs on a real-time basis (i.e., as they are entered by a user), in some embodiments the CB may aggregate and validate multiple user change commands that are entered within a predefined time interval (e.g., 1 second). This predefined time interval may be different from the local timer time interval implemented at each PE. By aggregating and validating multiple change commands in this manner, the CB can reduce the volume of change messages that are propagated through the topology in situations where the user enters many commands in quick succession (e.g., via cut-and-paste).

Further, while workflow 300 describes maintaining a separate CB-side timer per PE chain, in some embodiments the CB may maintain a single CB-side timer for all PE chains in the extended bridge. In these embodiments, the CB will send change messages to every PE in the bridge for every user-entered change command, regardless of whether the change affects the PE or not. This ensures that all of the timers in the system expire at the same time. Further, when the single CB-side timer expires, the CB will copy the entirety of the shadow tables over to the actual cascade port/LAG tables. One of ordinary skill in the art will recognize other variations, modifications, and alternatives.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. For example, although certain embodiments have been described with respect to particular process flows and steps, it should be apparent to those skilled in the art that the scope of the present disclosure is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. A method comprising:
   maintaining, by a first network device in a system of network devices, a shadow table that stores information regarding one or more ports and one or more link aggregation groups (LAGs) used to interconnect the network devices in the system;
   receiving, by the first network device from a user via a device user interface (UI), a first command relating to a change to at least a first port or a first link aggregation group (LAG) in the one or more ports or the one or more LAGs;
   updating, by the first network device, the shadow table based on the change;
   transmitting, by the first network device, a first message to one or more other network devices in the system that are affected by the change, the first message comprising information about the change; and
   starting, by the first network device, a timer associated with the one or more other network devices,
   wherein the updating and the transmitting are performed without blocking the user from entering further commands via the device UI,
   wherein the first message is received by a second network device in the system that is affected by the change,
   wherein, upon receipt of the first message, the second network device is configured to start a local timer, and
   wherein, upon expiration of the local timer, the second network device is configured to program the change into its hardware.

2. The method of claim 1 further comprising:
   receiving, from the user via the device UI, a second command relating to a change to at least a second port or a second LAG in the one or more ports or the one or more LAGs, wherein the change to the second port or the second LAG also affects the one or more other network devices affected by the change to the first port or the first LAG;
   updating the shadow table based on the change to the second port or the second LAG;
   restarting the timer associated with the one or more other network devices; and
   transmitting a second message to the one or more other network devices, the second message comprising information about the change to the second port or the second LAG.

3. The method of claim 2 wherein, if the timer has not yet expired upon receipt of the second message, the second network device is configured to restart the local timer.

4. The method of claim 1 further comprising, prior to transmitting the first message:
   validating the change based on contents of the updated table.

5. The method of claim of claim 4 wherein the validating comprises:
   verifying that the first port or all ports in the first LAG have the same configured speed.

6. The method of claim of claim 4 wherein the validating comprises:
   verifying that the first port or all ports in the first LAG are not part of a tagged VLAN (Virtual Local Area Network).

7. The method of claim of claim 4 wherein the validating comprises:
   verifying that the first port or all ports in the first LAG are not used in OSPF (Open Shortest Path First) OSPF or PIM (Protocol Independent Multicast) protocols.

8. The method of claim of claim 4 wherein the validating comprises:
   verifying that the change results in the same number of ports at both ends of a link or trunk connected to the first port or the first LAG.

9. The method of claim 1 wherein the first network device is a controlling bridge (CB) and wherein the system of network devices is an extended bridge.

10. The method of claim 9 wherein the first command relates to a dynamic change to a live cascade link or trunk in the extended bridge.

11. The method of claim 1 further comprising, prior to transmitting the first message:
    receiving, from the user via the device UI, one or more further commands relating to changes to the one or more ports or the one or more LAGs, the one or more further commands being received within a predefined time interval from the first command; and
    updating the shadow table based on the one or more further commands,
    wherein the first message comprises an aggregated set of change information derived from the first command and the one or more further commands.

12. A non-transitory computer readable storage medium having stored thereon program code executable by a first network device in a system of network devices, the program code causing the first network device to:
    maintain a shadow table storing information regarding one or more ports and one or more link aggregation groups (LAGs) used to interconnect the network devices in the system;
    receive, from a user via a device user interface (UI), a first command relating to a change to at least a first port or a first link aggregation group (LAG) in the one or more ports or the one or more LAGs;
update the shadow table based on the change;
transmit a first message to every one or more other network devices in the system that are affected by the change, the first message comprising information about the change; and
start a timer associated with the one or more other network devices,
wherein the updating and the transmitting are performed without blocking the user from entering further commands via the device UI,
wherein the first message is received by a second network device in the system that is affected by the change,
wherein, upon receipt of the first message, the second network device is configured to start a local timer, and
wherein, upon expiration of the local timer, the second network device is configured to program the change into its hardware.

13. The non-transitory computer readable storage medium of claim 12 wherein the program code further causes the network device to:
receive, from the user via the device UI, a second command relating to a change to at least a second port or a second LAG in the one or more ports or the one or more LAGs, wherein the change to the second port or the second LAG also affects the one or more other network devices affected by the change to the first port or the first LAG;
update the shadow table based on the change to the second port or the second LAG;
restart the timer associated with the one or more other network devices; and
transmit a second message to the one or more other network devices, the second message comprising information about the change to the second port or the second LAG.

14. The non-transitory computer readable storage medium of claim 13 wherein, if the timer has not yet expired upon receipt of the second message, the second network device is configured to restart the local timer.

15. A network device comprising:
a processor; and
a non-transitory computer readable medium having stored thereon program code that, when executed by the processor, causes the processor to:
maintain a shadow table storing information regarding one or more ports and one or more link aggregation groups (LAGs) used to interconnect the network devices in the system;
receive, from a user via a device user interface (UI), a first command relating to a change to at least a first port or a first link aggregation group (LAG) in the one or more ports or the one or more LAGs;
update the shadow table based on the change;
transmit a first message to one or more other network devices in the system that are affected by the change, the first message comprising information about the change, and
start a timer associated with the one or more other network devices,
wherein the updating and the transmitting are performed without blocking the user from entering further commands via the device UI,
wherein the first message is received by a second network device in the system that is affected by the change,
wherein, upon receipt of the first message, the second network device is configured to start a local timer, and
wherein, upon expiration of the local timer, the second network device is configured to program the change into its hardware.

16. The network device of claim 15 wherein the program code further causes the processor to:
receive, from the user via the device UI, a second command relating to a change to at least a second port or a second LAG in the one or more ports or the one or more LAGs, wherein the change to the second port or the second LAG also affects the one or more other network devices affected by the change to the first port or the first LAG;
update the shadow table based on the change to the second port or the second LAG;
restart the timer associated with the one or more other network devices; and
transmit a second message to the one or more other network devices, the second message comprising information about the change to the second port or the second LAG.

17. The network device of claim 16 wherein, if the timer has not yet expired upon receipt of the second message, the second network device is configured to restart the local timer.

18. A method comprising:
maintaining, by a first network device in a system of network devices, a shadow table that stores information regarding one or more ports and one or more link aggregation groups (LAGs) used to interconnect the network devices in the system;
receiving, by the first network device from a user via a device user interface (UI), a first command relating to a change to at least a first port or a first link aggregation group (LAG) in the one or more ports or the one or more LAGs;
updating, by the first network device, the shadow table based on the change;
validating, by the first network device, the change based on contents of the updated shadow table;
subsequently to the validating, transmitting, by the first network device, a first message to one or more other network devices in the system that are affected by the change, the first message comprising information about the change; and
starting, by the first network device, a timer associated with the one or more other network devices,
wherein the updating and the transmitting are performed without blocking the user from entering further commands via the device UI.

19. A non-transitory computer readable storage medium having stored thereon program code executable by a first network device in a system of network devices, the program code causing the first network device to:
maintain a shadow table storing information regarding one or more ports and one or more link aggregation groups (LAGs) used to interconnect the network devices in the system;
receive, from a user via a device user interface (UI), a first command relating to a change to at least a first port or a first link aggregation group (LAG) in the one or more ports or the one or more LAGs;
update the shadow table based on the change;
validate the change based on contents of the updated shadow table;

subsequently to the validating, transmit a first message to every one or more other network devices in the system that are affected by the change, the first message comprising information about the change; and start a timer associated with the one or more other network devices, wherein the updating and the transmitting are performed without blocking the user from entering further commands via the device UI.

20. A network device comprising:

a processor; and a non-transitory computer readable medium having stored thereon program code that, when executed by the processor, causes the processor to:

maintain a shadow table storing information regarding one or more ports and one or more link aggregation groups (LAGs) used to interconnect the network devices in the system;

receive, from a user via a device user interface (UI), a first command relating to a change to at least a first port or a first link aggregation group (LAG) in the one or more ports or the one or more LAGs;

update the shadow table based on the change;

validate the change based on contents of the updated shadow table;

subsequently to the validating, transmit a first message to one or more other network devices in the system that are affected by the change, the first message comprising information about the change, and start a timer associated with the one or more other network devices, wherein the updating and the transmitting are performed without blocking the user from entering further commands via the device UI.

\* \* \* \* \*